United States Patent
Beukema et al.

(10) Patent No.: US 7,500,062 B2
(45) Date of Patent: Mar. 3, 2009

(54) FAST PATH MEMORY READ REQUEST PROCESSING IN A MULTI-LEVEL MEMORY ARCHITECTURE

(75) Inventors: Bruce Leroy Beukema, Hayfield, MN (US); Michael Bar-Joshua, Haifa (IL); Alexander Mesh, Haifa (IL); Shaul Yifrach, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 11/282,093

(22) Filed: Nov. 17, 2005

(65) Prior Publication Data

US 2007/0113019 A1    May 17, 2007

(51) Int. Cl.
*G06F 12/00* (2006.01)
(52) U.S. Cl. .................. 711/137; 712/205; 712/207
(58) Field of Classification Search .............. 711/122, 711/117, 138, 118, 119, 120, 137
See application file for complete search history.

(56) References Cited

U.S. PATENT DOCUMENTS

| | | | |
|---|---|---|---|
| 5,386,511 A | 1/1995 | Murata et al. | |
| 5,745,913 A * | 4/1998 | Pattin et al. | 711/105 |
| 5,913,215 A * | 6/1999 | Rubinstein et al. | 707/10 |
| 5,918,069 A | 6/1999 | Matoba | |
| 6,021,472 A | 2/2000 | Hamaguchi et al. | |
| 6,347,363 B1 * | 2/2002 | Arimilli et al. | 711/150 |
| 6,449,699 B2 | 9/2002 | Franke et al. | |
| 6,820,143 B2 | 11/2004 | Day et al. | |
| 6,820,174 B2 | 11/2004 | Vanderwiel | |
| 2002/0059501 A1 | 5/2002 | McKinney et al. | |
| 2002/0129210 A1 | 9/2002 | Arimilli et al. | |
| 2004/0068624 A1 | 4/2004 | Van Doran et al. | |
| 2004/0117592 A1 | 6/2004 | Day et al. | |
| 2004/0162946 A1 | 8/2004 | Day et al. | |
| 2004/0186963 A1 | 9/2004 | Dieffenderfer et al. | |
| 2004/0263519 A1 | 12/2004 | Andrews et al. | |

* cited by examiner

*Primary Examiner*—Kevin L Ellis
*Assistant Examiner*—Matthew Bradley
(74) *Attorney, Agent, or Firm*—Wood, Herron & Evans, LLP

(57) ABSTRACT

A circuit arrangement and method selectively reorder speculatively issued memory read requests being communicated to a lower memory level in a multi-level memory architecture. In particular, a memory read request that has been speculatively issued to a lower memory level prior to completion of a cache lookup operation initiated in a cache memory in a higher memory level may be reordered ahead of at least one previously received and pending request awaiting communication to the lower memory level. By doing so, the latency associated with the memory read request is reduced when the request results in a cache miss in the higher level memory, and as a result, system performance is improved.

7 Claims, 3 Drawing Sheets

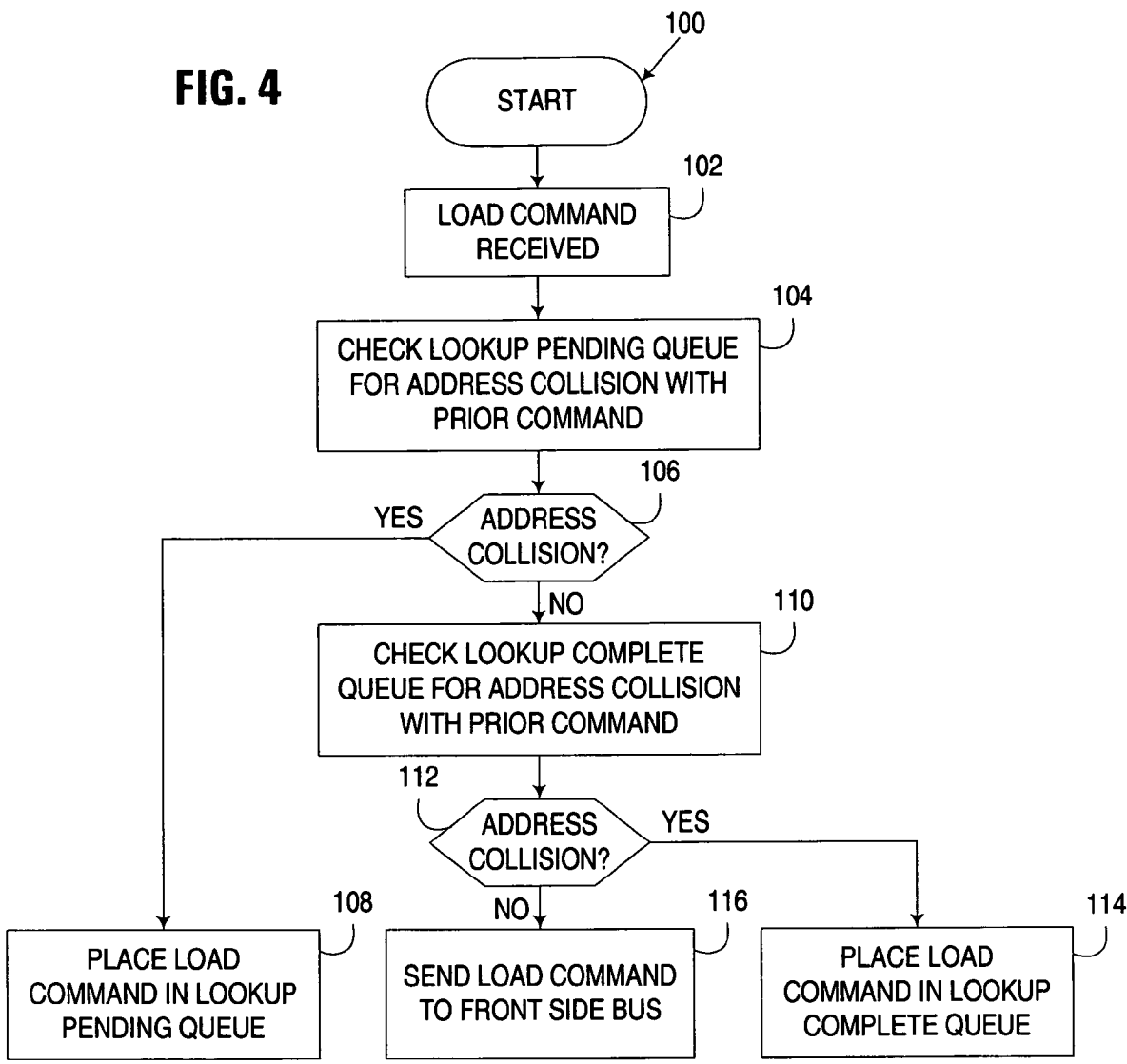

FAST PATH MEMORY READ REQUEST PROCESSING IN A MULTI-LEVEL MEMORY ARCHITECTURE

FIELD OF THE INVENTION

The invention relates to computers and data processing systems, and in particular to retrieval of data from a multi-level memory architecture.

BACKGROUND OF THE INVENTION

Computer technology continues to advance at a remarkable pace, with numerous improvements being made to the performance of both microprocessors—the "brains" of a computer—and the memory that stores the information processed by a computer.

In general, a microprocessor operates by executing a sequence of instructions that form a computer program. The instructions are typically stored in a memory system having a plurality of storage locations identified by unique memory addresses. The memory addresses collectively define a "memory address space," representing the addressable range of memory addresses that can be accessed by a microprocessor.

Both the instructions forming a computer program and the data operated upon by those instructions are often stored in a memory system and retrieved as necessary by the microprocessor when executing the computer program. The speed of microprocessors, however, has increased relative to that of memory devices to the extent that retrieving instructions and data from a memory can often become a significant bottleneck on performance. To decrease this bottleneck, it is desirable to use the fastest available memory devices possible. However, both memory speed and memory capacity are typically directly related to cost, and as a result, many computer designs must balance memory speed and capacity with cost.

A predominant manner of obtaining such a balance is to use multiple "levels" of memories in a memory architecture to attempt to decrease costs with minimal impact on system performance. Often, a computer relies on a relatively large, slow and inexpensive mass storage system such as a hard disk drive or other external storage device, an intermediate main memory that uses dynamic random access memory devices (DRAM's) or other volatile memory storage devices, and one or more high speed, limited capacity cache memories, or caches, implemented with static random access memory devices (SRAM's) or the like. In some instances, instructions and data are stored in separate instruction and data cache memories to permit instructions and data to be accessed in parallel. One or more memory controllers are then used to swap the information from segments of memory addresses, often known as "cache lines", between the various memory levels to attempt to maximize the frequency that requested memory addresses are stored in the fastest cache memory accessible by the microprocessor. Whenever a memory request attempts to access a memory address that is not cached in a cache memory, a "cache miss" occurs. As a result of a cache miss, the cache line for a memory address typically must be retrieved from a relatively slow, lower level memory, often with a significant performance hit.

In many multi-level memory architectures, a memory request is not forwarded to lower levels of memory until it is determined that a cache miss has occurred in a higher level cache memory. As a result, a delay is often introduced during this determination, an operation that is often referred to as a cache lookup, or snoop, operation. Other architectures attempt to eliminate this delay by speculatively issuing some memory requests to a lower level of memory concurrently with performing the cache lookup operation. In some instances, performance is increased for cache misses, as the lower level memory is able to begin processing the memory request prior to completion of the cache lookup operation in the higher level of memory. In other instances, however, performance can be decreased due to the fact that the lower level memory is required to process additional memory requests, which increases the workload of the lower level memory and decreases the available bandwidth of the memory buses that communicate the requests between components in the memory architecture. Given the fact that the additional memory requests are typically those memory requests that result in a cache hit on the upper level of memory, the results of processing the memory requests in the lower level memory are often never used, thus occupying system resources that could otherwise be used for more productive activities.

In addition, even in the event that speculatively issued memory requests are eventually used, some latency is still typically associated with the issuance of memory requests in a number of conventional memory architectures. Many architectures, for example, are pipelined such that requests are handled in a First-In-First-Out (FIFO), i.e., where the requests are communicated to a lower level memory in the order they were received. In some instances, however, memory requests that are directed to more performance-critical data are stalled waiting for less critical, but earlier issued, memory requests to be communicated to the lower level memory, thus reducing throughput in performance-critical areas.

As an example, in many architectures, memory write requests are often relatively low priority operations since the write requests are predominantly issued to update a copy of a cache line in a lower level memory after the cache line is no longer being used in the upper level memory. As a result, these memory write requests are often not as performance-critical as other types of requests, in particular read or load requests.

Therefore, a need continues to exist in the art for reducing the latency associated with handling memory requests in a multi-level memory architecture.

SUMMARY OF THE INVENTION

The invention addresses these and other problems associated with the prior art by selectively reordering speculatively issued memory read requests being communicated to a lower memory level in a multi-level memory architecture. In particular, a memory read request that has been speculatively issued to a lower memory level prior to completion of a cache lookup operation initiated in a cache memory in a higher memory level may be reordered ahead of at least one previously received and pending request awaiting communication to the lower memory level. By doing so, the latency associated with the memory read request is reduced when the request results in a cache miss in the higher level memory, and as a result, system performance is improved.

In some embodiments consistent with the invention, for example, memory requests that have been issued to a lower memory level in a multi-level memory architecture are maintained on a request queue prior to being communicated to the lower memory level. A memory read request that has been speculatively issued to the lower memory level concurrently with a cache lookup operation being performed on a higher memory level may be reordered relative to other pending memory requests awaiting communication to the lower memory level by bypassing the request queue in the event that it is determined that no memory write request directed to the same cache line as the memory read request is already pending in the request queue. As such, communication of the memory read request may be accelerated relative to other pending memory requests, thus reducing latency for the memory read request and improving system performance when the memory read request results in a cache miss in the higher memory level.

Therefore, consistent with the invention, a memory read request is processed in a multi-level memory architecture of the type including first and second memory levels, wherein the first memory level comprises a cache memory. In response to receiving the memory read request, a cache lookup operation is initiated to determine if the memory read request is directed to a cache line currently cached in the cache memory in the first memory level, and the memory read request is speculatively issued to the second memory level prior to completion of the cache lookup operation. Furthermore, the memory read request is reordered ahead of at least one previously received and pending request awaiting communication to the second memory level.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 4 is a flowchart illustrating an exemplary sequence of operations performed during the processing of a load command received by the CPU bus interface logic of FIG. 2.

DETAILED DESCRIPTION

Figure 1:
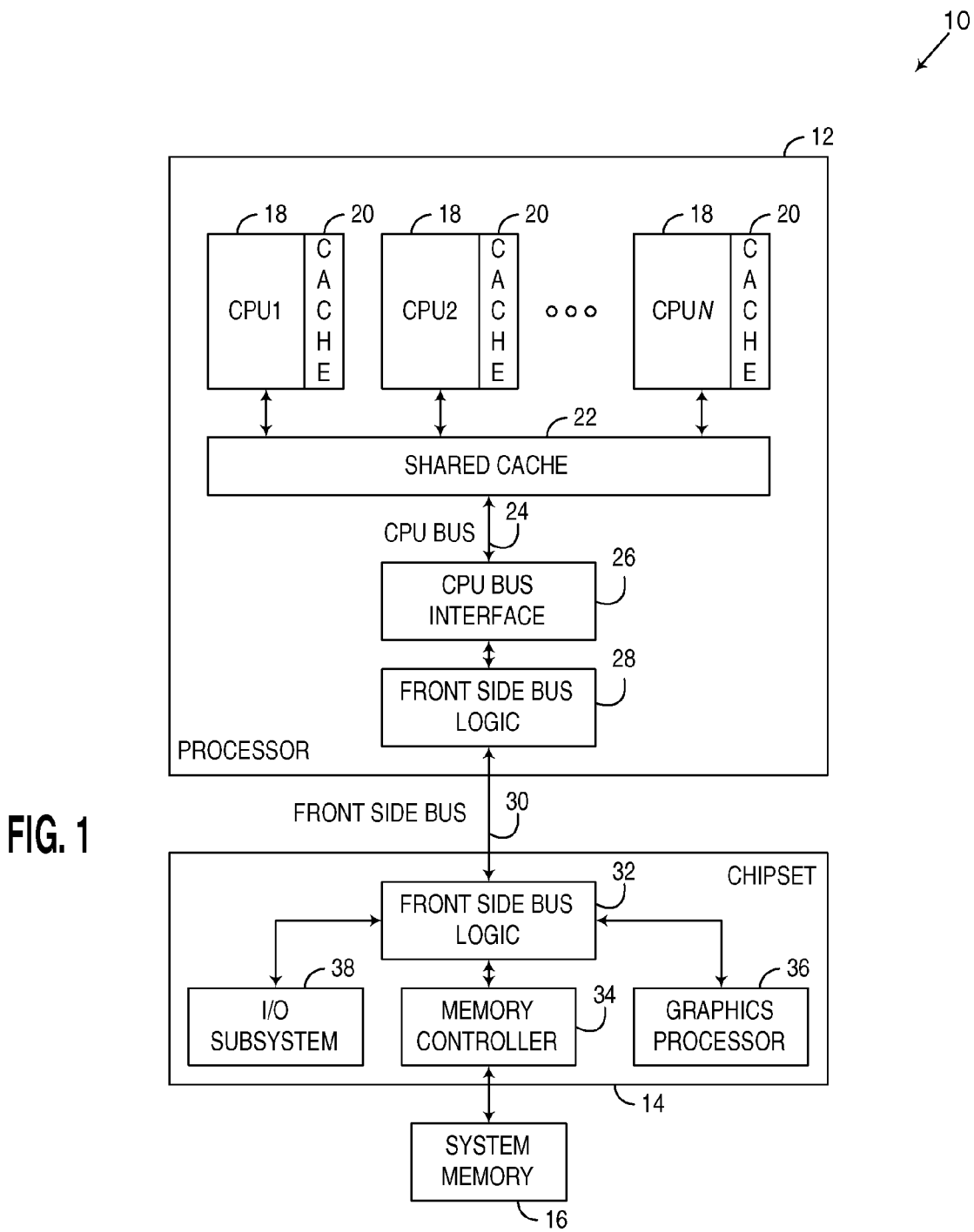
FIG. 1 is a block diagram of an exemplary apparatus utilizing a processor incorporating fast path memory read request processing consistent with the invention.

The embodiments discussed and illustrated hereinafter selectively reorder a speculatively issued memory read request being communicated to a lower memory level in a multi-level memory architecture ahead of at least one previously received and pending request awaiting communication to the lower memory level. The issuance of a request within the context of the invention constitutes an initiation of an operation to communicate the request to a lower memory level in a multi-level memory architecture. However, it will be appreciated that after a request has been issued, there may be some delay before the request is actually communicated to the lower memory level. Furthermore, it will be appreciated that a request is speculatively issued when the operation to communicate the request to the lower memory level is initiated prior to receiving the results of a cache lookup operation on a higher memory level, since, at the time the operation is initiated, it is not known whether the request to the lower memory level will ultimately be needed and used.

As will become more apparent below, such a delay may be the result of one or more request queues or other predominantly first-in-first-out (FIFO) data structures that temporarily store pending requests that have already been issued but are still awaiting communication. By reordering a particular request, therefore, a request is prioritized relative to a previously receiving and pending request by moving the reordered request ahead of the previous request in the queue that would otherwise be communicated prior to the reordered request based upon the FIFO nature of the queue. In many instances, selective ordering may result in the request queue being bypassed in its entirety.

In the illustrated embodiments below, such reordering is based upon a determination being made that there is no previously received and pending write request directed to the same cache line in a request queue. In many instances, reordering a memory read request ahead of a memory write request directed to the same cache line would result in the memory read request obtaining a stale copy of the cache line, by virtue of the earlier-in-time memory write request being communicated after the reordered memory read request. As such, it is desirable to prevent such reordering from occurring for data integrity purposes.

The selective reordering performed in the illustrated embodiments is referred to as a fast path load. It will be appreciated that in some embodiments, the fast path load may be initiated for all memory read requests, or load commands. In other embodiments, however, fast path loads may be implemented for only certain types of load commands, e.g., specially designated "fast path" load commands. Indeed, it may be desirable to utilize such load commands only for particular types of data where it is known that the likelihood of a cache miss is relatively high, e.g., in graphics applications where data is only updated once. In addition, it will be appreciated that specific types of load commands could also be designated via one or more identifiable address ranges.

Turning to the Drawings, wherein like numbers denote like parts throughout the several views, FIG. 1 illustrates a computer 10 incorporating a processor 12 that represents one suitable environment within which fast path memory read request processing may be implemented in a manner consistent with the invention. Computer 10 generically represents, for example, any of a number of different types of electronic devices such as a multi-user computer (e.g., a network server, a midrange computer, a mainframe computer, etc.), a single-user computer (e.g., a workstation, a desktop computer, a portable computer, etc.), or another type of programmable electronic device (e.g., a set top box, a game machine, etc.).

Processor 12 is typically coupled to a chipset 14 that interfaces the processor, and optionally, a plurality of processors, to a system memory 16. In addition, in the embodiment illustrated in FIG. 1, processor 12 is implemented as a multi-core processor including a plurality of processor cores (CPU's) 18 disposed on the same integrated circuit.

A multi-level memory architecture in computer 10 includes system memory 16 along with a plurality of cache memories interposed between the processor cores 18 and system memory 16, including one or more levels of dedicated caches 20 and at least one level of shared cache 22. A cache is dedicated from the standpoint that it serves only a single processor core, while a shared cache serves multiple processor cores. It will be appreciated that each cache 20, 22 may represent multiple caches, e.g., separate instruction and data caches, multiple levels of caches (e.g., L2 and L3 caches), etc. It will also be appreciated that additional cache memories may be disposed in chipset 14, e.g., to serve multiple processors 12.

Processor cores 18 issue memory requests that are initially handled by dedicated caches 20, and if a cache miss occurs, the requests are forwarded to shared cache 22. In the illustrated embodiment, shared cache 22 is coupled to a CPU bus 24, and requests that are forwarded to the cache for lookup and retrieval (if a cache hit) are also speculatively issued over CPU bus 24 to CPU bus interface logic 26 to pass the request along to the chipset. As such, CPU bus interface logic 26 is coupled to front side bus logic 28, which is in turn coupled to corresponding front side bus logic 32 in chipset 14 over front side bus 30. Front side bus logic 32 in chipset 14 routes requests to appropriate destinations, including a memory controller 34 coupled to system memory 16, an I/O subsystem 38 for accessing peripherals such as workstations, networked devices, storage devices, etc., and a graphics processor 36 for driving a graphics display (not shown).

Any number of alternate computer architectures may be used in the alternative. For example, processor 12 may be implemented as a single core processor. Likewise, chipset 14 may include one or more levels of cache memories to serve one or more interconnected processors. Furthermore, alternate memory architectures, such as NUMA or distributed memory architectures, may be utilized. In general, it will be appreciated that the invention may find benefit in practically any multi-level memory architecture where memory requests can be speculatively issued to a lower memory level concurrently with performing a cache lookup in a higher memory level.

Computer 10, or any subset of components therein, may also be referred to hereinafter as an "apparatus". It should be recognized that the term "apparatus" may be considered to incorporate various data processing systems such as computers and other electronic devices, as well as various components within such systems, including individual integrated circuit devices or combinations thereof. Moreover, within an apparatus may be incorporated one or more logic circuits that circuit arrangements, typically implemented on one or more integrated circuit devices, and optionally including additional discrete components interfaced therewith.

It should also be recognized that circuit arrangements are typically designed and fabricated at least in part using one or more computer data files, referred to herein as hardware definition programs, that define the layout of the circuit arrangements on integrated circuit devices. The programs are typically generated in a known manner by a design tool and are subsequently used during manufacturing to create the layout masks that define the circuit arrangements applied to a semiconductor wafer. Typically, the programs are provided in a predefined format using a hardware definition language (HDL) such as VHDL, Verilog, EDIF, etc. Thus, while the invention has and hereinafter will be described in the context of circuit arrangements implemented in fully functioning integrated circuit devices, those skilled in the art will appreciate that circuit arrangements consistent with the invention are capable of being distributed as program products in a variety of forms, and that the invention applies equally regardless of the particular type of computer readable media used to actually carry out the distribution. Examples of computer readable media include but are not limited to tangible, recordable type media such as volatile and non-volatile memory devices, floppy disks, hard disk drives, CD-ROM's, and DVD's, among others, and transmission type media such as digital and analog communications links.

Figure 2:
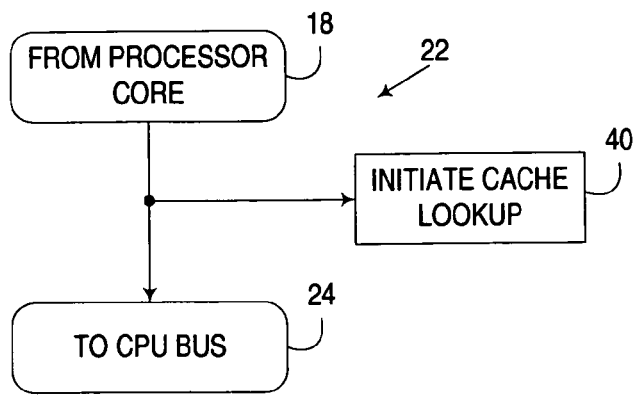
FIG. 2 is a block diagram of one exemplary implementation of speculative request issuance logic in the shared cache of FIG. 1.
Figure 3:
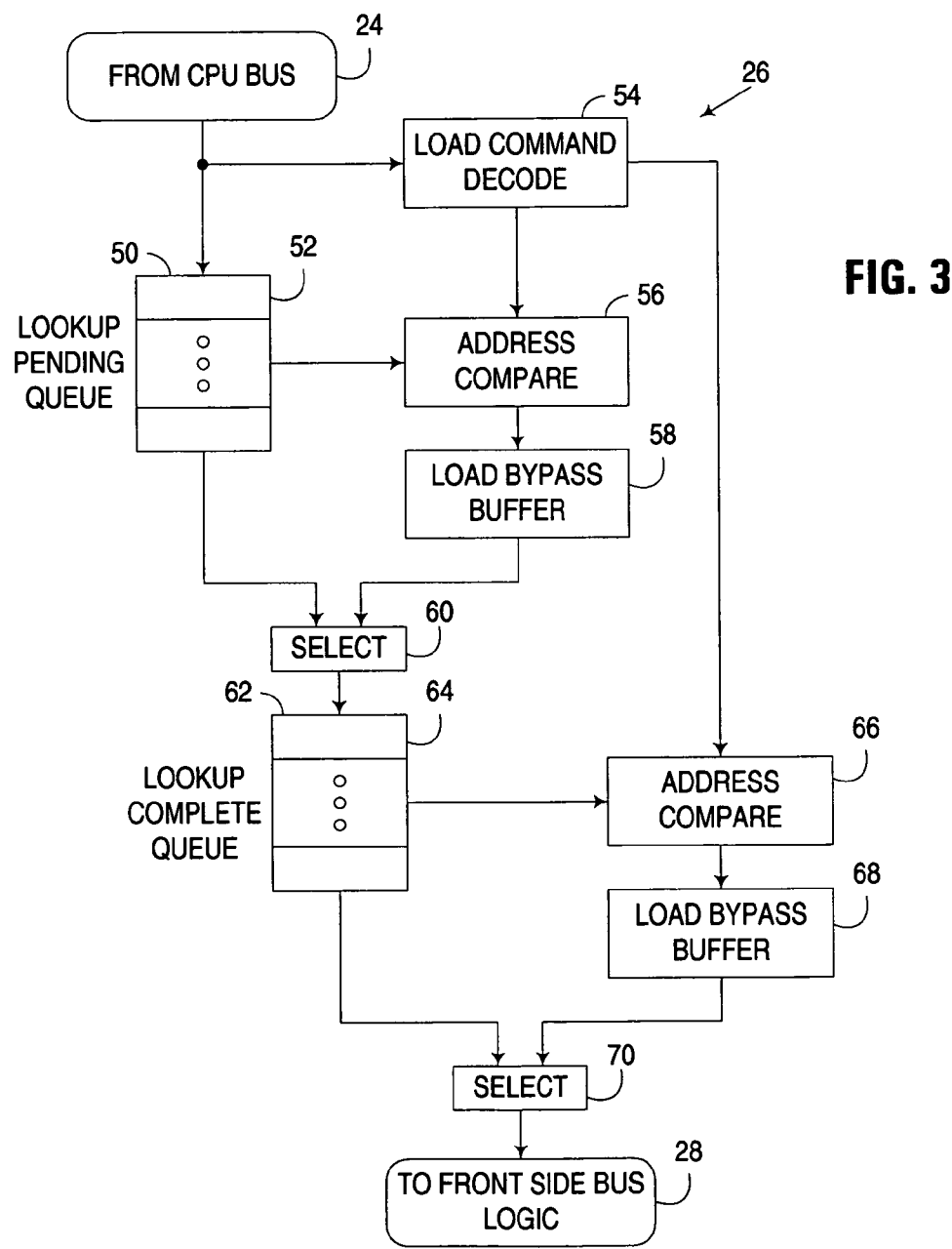
FIG. 3 is a block diagram of one exemplary implementation of the CPU bus interface logic of FIG. 1.

Turning now to FIGS. 2 and 3, as noted above, embodiments consistent with the invention combine speculative issuance of a request to a lower level memory with selective reordering of the request ahead of at least one previously received and pending request awaiting communication to the lower memory level. In the embodiment illustrated herein, the request is a memory read request, or load command, that is speculatively issued by a processor chip to a chipset over front side bus logic prior to receiving the results of a cache lookup operation on a cache in the processor chip. Furthermore, the selective reordering is based upon determining whether a memory write request directed to the same cache line as the memory read request is currently awaiting communication to the chipset in a request queue disposed in the processor chip. In other embodiments, selective reordering may also be based upon detected collisions with other memory read requests in addition to or in lieu of collisions with memory write requests.

In the illustrated embodiment, speculative issuance of a memory read request is implemented primarily in speculative request issuance logic in the cache controller for shared cache 22. As shown in FIG. 2, for example, it may be seen that the speculative request issuance logic in shared cache 22 receives a memory request from a processor core 18 and feeds the request to CPU bus 24 concurrently with initiating a cache lookup for the cache line associated with the memory request in block 40.

As shown in FIG. 3, selective reordering of requests in the illustrated embodiment is implemented primarily in CPU bus interface logic 26. In particular, logic 26 implements a pipelined architecture, and a request received from CPU bus 24 is fed to a first FIFO data structure or queue, referred to as a lookup pending queue 50, which includes a plurality of entries 52 used to store a plurality of requests awaiting lookup (or snoop) responses. Each request is also fed from CPU bus 24 to load command decode logic 54, which is used to detect whether a transaction received over the CPU bus 24 is a memory read request, or load command.

Logic 54, upon detecting a load command, forwards the cache line associated with the received request to first address compare logic 56, which compares the cache line with the cache lines of each of the requests stored in lookup pending queue 50. First address compare logic 56 outputs the current request to a first load bypass buffer 58, which temporarily buffers the current request and feeds one input to a two-way multiplexer 60, also referred to herein as first select logic.

The other input to the first select logic is the output of lookup pending queue 50, and the first select logic selectively outputs either of the inputs to a second FIFO data structure or queue, also referred to as a lookup complete queue 62, which includes a plurality of entries 64 used to store a plurality of requests for which lookup responses have already been received, but that are still awaiting communication over the front side bus.

Load command decode logic 54 additionally forwards the cache line associated with a received load command to second address compare logic 66, which compares the cache line with the cache lines of each of the requests stored in lookup complete queue 62. Second address compare logic 66 outputs the current request to a second load bypass buffer 68, which temporarily buffers the current request and feeds one input to a two-way multiplexer 70, also referred to herein as second select logic.

The other input to the second select logic is the output of lookup complete queue 62, and the second select logic selectively outputs either of the inputs to the front side bus logic 28 for communication to the chipset.

With continuing reference to FIG. 3, FIG. 4 illustrates at 100 an exemplary sequence of operations performed during the processing of a load command received by CPU bus interface logic 26. Specifically, block 102 illustrates the detection that a memory request is a load command by load command decode logic 54. Block 104 next illustrates the check in first address compare logic 56 for an address collision with a prior command stored in lookup pending queue 50, i.e., where the cache line associated with the load command matches that of another command or request currently queued in lookup pending queue 50.

As shown in block 106, if an address collision is detected, the load command is not permitted to be reordered ahead of one of the commands stored in lookup pending queue 50, and as such, control passes to block 108 to place the load command in lookup pending queue 50 for in order processing by the CPU bus interface logic.

Returning to block 106, if an address collision is not detected, block 106 passes control to block 110, which illustrates the check in second address compare logic 66 for an address collision with a prior command stored in lookup complete queue 62, i.e., where the cache line associated with the load command matches that of another command or request currently queued in lookup complete queue 62.

As shown in block 112, if an address collision is detected, the load command is not permitted to be reordered ahead of one of the commands stored in lookup complete queue 62, and as such, control passes to block 114 to place the load command in lookup complete queue 62 for in order processing by the CPU bus interface logic. As shown in FIG. 3, the load command is inserted into the data stream between queues 50 and 62 by controlling first select logic 60 to pass the load command from buffer 58 to lookup complete queue 62. Effectively, the load command is placed at the top of lookup pending queue 50 such that it is the next command placed into lookup complete queue 62.

Returning to block 112, if an address collision is not detected, block 112 passes control to block 116, which illustrates the load command being sent directly to front side bus logic 28. Specifically, as shown in FIG. 3, the load command is fed directly to front side bus logic 28 by controlling second select logic 70 to pass the load command from buffer 68 to front side bus logic 28. Effectively, the load command is placed at the top of lookup complete queue 62 such that it is the next command output to front side bus logic 28 for communication over front side bus 30.

It will be appreciated that, particularly in the instance where a command bypasses both queues 50, 62, the load command in many instances will be communicated to front side bus logic 28, and thereafter over front side bus 30, prior to a lookup response being received from shared cache 22.

It will also be appreciated that the sequence of operations shown in FIG. 4 are not required to be sequential in nature. In particular, it will be appreciated that the address collision detection of queues 50 and 62 may be performed concurrently by blocks 104 and 110 such that, for every load command, one of three destinations may be selected based upon the commands currently stored in queues 50 and 62, as represented in Table I (where a "1" represents a detected collision):

TABLE I

Fast Path Load Truth Table

| First Address Compare (56) | Second Address Compare (66) | Fast Path Load Bypass Mode |
|---|---|---|
| 0 | 0 | Bypass Both Queues |
| 0 | 1 | Bypass Lookup Pending Queue |
| 1 | X | No Bypass Allowed |

It will be appreciated that, for non-load commands, e.g., memory write commands, such commands are queued into lookup pending queue 50 and lookup complete queue 62 in regular, sequential order. Furthermore, it will be appreciated that lookup pending queue 50 includes logic that receives lookup responses over CPU bus 24 such that it can be determined whether commands pending in queue 50 still need to be passed to the chipset. In addition, in the illustrated embodiment, commands awaiting lookup responses in queue 50 will receive responses in order, and as such, such commands will either be passed to the lookup complete queue 62 in sequential order if still needed, or discarded if not. In other embodiments, lookup responses may be received out of order, and as such, additional logic may be utilized in queue 50 to move commands from the queue to lookup complete queue 62 out of order, if necessary. It will be appreciated that logic is also provided in CPU bus interface logic 26 for cancelling or discarding commands for which a lookup response received therefor indicates that the command hit on the higher level cache.

Furthermore, while load commands are shown selectively bypassing one or both of queues 50, 62, in other embodiments, only one queue may be used and selectively bypassed. In addition, selective reordering may be performed at a finer level of granularity, e.g., using more queues, or allowing load commands to be inserted anywhere in a chain of commands, e.g., immediately following a command that the load command collides with, if a collision is detected.

It will be appreciated that implementation of the functionality described above in one or more integrated circuits would be well within the abilities of one of ordinary skill in the art having the benefit of the instant disclosure. It will also be appreciated that various additional modifications may be made to the illustrated embodiments consistent with the invention. Therefore, the invention lies in the claims hereinafter appended.

What is claimed is:

1. A method of processing a memory read request in a multi-level memory architecture of the type including a cache memory and a main memory, the method comprising, in response to receiving the memory read request:
   initiating a cache lookup operation to determine if the memory read request is directed to a cache line currently cached in the cache memory;
   speculatively issuing the memory read request to the main memory prior to completion of the cache lookup operation by:
   receiving the memory read request;
   determining whether the memory read request is directed to the same cache line as any memory write request stored in a first queue that stores requests awaiting a cache lookup response;
   bypassing the first queue in response to determining that the memory read request is not directed to the same cache line as any memory write request stored in the first queue;
   determining whether the memory read request is directed to the same cache line as any memory write request stored in a second queue that stores requests for which cache lookup responses have been received and that are awaiting communication to the main memory; and
   bypassing the second queue in response to determining that the memory read request is not directed to the same cache line as any memory write request stored in the second queue.

2. A method of processing a memory read request in a multi-level memory architecture of the type including first and second memory levels, wherein the first memory level comprises a cache memory, the method comprising, in response to receiving the memory read request:

initiating a cache lookup operation to determine if the memory read request is directed to a cache line currently cached in the cache memory in the first memory level; and speculatively issuing the memory read request to the second memory level prior to completion of the cache lookup operation, including reordering the memory read request ahead of at least one previously received and pending request awaiting communication to the second memory level, wherein reordering the memory request includes determining if another request directed to the same cache line as that to which the memory read request is directed is currently pending in a request queue and placing the memory read request at a top of the request queue if no other request directed to the same cache line as that to which the memory read request is directed is currently pending in the request queue.

3. The method of claim 2, wherein determining if another request directed to the same cache line as that to which the memory read request is directed is currently pending in the request queue includes determining if a memory write request directed to the same cache line as that to which the memory read request is directed is currently pending in the request queue.

4. The method of claim 2, wherein placing the memory read request at the top of the request queue comprises storing the memory read request in a bypass buffer.

5. The method of claim 2, wherein the request queue comprises a lookup pending queue that stores requests awaiting a cache lookup response from the first memory level.

6. The method of claim 5, wherein reordering the memory read request further comprises:

determining if another request directed to the same cache line as that to which the memory read request is directed is currently pending in a lookup complete queue; and placing the memory read request at a top of the lookup complete queue if no other request directed to the same cache line as that to which the memory read request is directed is currently pending in the lookup complete queue.

7. The method of claim 2, wherein the request queue comprises a lookup complete queue that stores requests for which cache lookup responses have been received and that are awaiting transmission to the second memory level.

\* \* \* \* \*